May 8, 1923.  
F. W. BECKER ET AL  
ILLUMINATING DEVICE FOR AUTOMOBILES  
Filed April 17, 1922

Inventors.  
Frederick W. Becker.  
Joseph Lagner.  
by their atty.

Patented May 8, 1923.

1,454,465

UNITED STATES PATENT OFFICE.

FREDERICK W. BECKER AND JOSEPH LAGNER, OF HYDE PARK, MASSACHUSETTS.

ILLUMINATING DEVICE FOR AUTOMOBILES.

Application filed April 17, 1922. Serial No. 553,903.

*To all whom it may concern:*

Be it known that we, FREDERICK W. BECKER, a citizen of the United States, residing at Hyde Park, county of Suffolk, and State of Massachusetts, and JOSEPH LAGNER, a citizen of the United States, residing at Hyde Park, in the county of Suffolk and State of Massachusetts, have invented new and useful Improvements in Illuminating Devices for Automobiles, of which the following is a specification.

This invention relates to an illuminating device for automobiles, the object of the invention being to provide a lamp which may be attached at any desired location at the rear of an automobile, and primarily constitute a tail light therefor, said lamp being so constructed and positioned that said rays of light therefrom will simultaneously illuminate the automobile license plate and the ground immediately adjacent to the rear of said automobile, while other rays of light will be projected transversely toward the left of said automobile and at a slight angle downwardly in such a manner that the driver of an automobile approaching the first-named automobile from the rear may clearly see the outline of the automobile in front of him, thereby making it easier for said driver to gauge his distance and allow sufficient clearance between the automobiles when passing.

The invention consists in the combination and arrangement of parts set forth in the following specification and particularly pointed out in the claims thereof.

Referring to the drawings.

Like numerals refer to like parts throughout the several views of the drawings.

Figure 1:
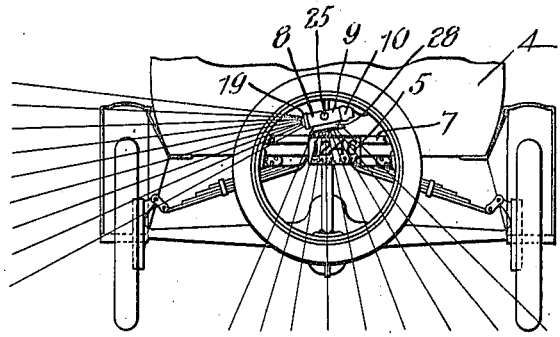
Figure 1 represents a rear elevation of the lower portion of an automobile with a lamp embodying my invention attached thereto.
Figure 2:
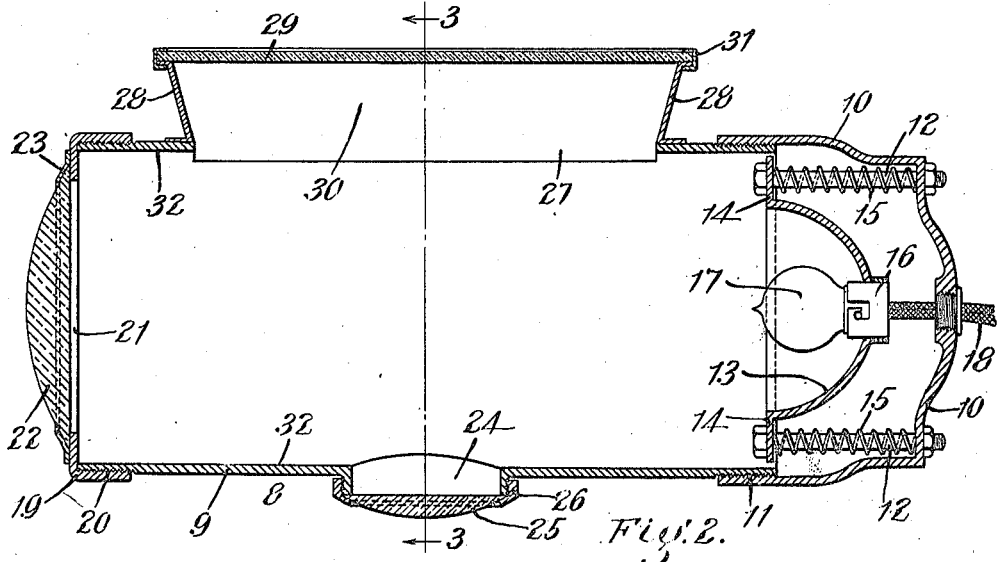
Fig. 2 is a longitudinal section partly in elevation of said lamp.
Figure 3:
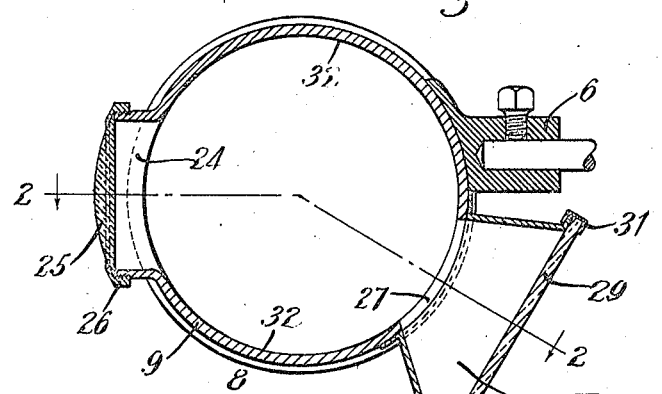
Fig. 3 is a transverse section taken on the line 3—3 of Fig. 2.

In the drawings, 4 represents a portion of the body of an automobile as viewed from the rear thereof and 5 is a license plate attached at a suitable point thereon. Also attached in any suitable manner at the rear of the body 4 as, for example, by a bracket 6 fastened to a frame 7 provided for the purpose of supporting the spare tires, and preferably positioned a short distance above and to the rear of the license plate 5 is a lamp casing 8, a main body member 9 of which is preferably cylindrical in form. Located at one end of the cylindrical member 9 is a cap 10 which has screw-threaded engagement with said cylindrical member 9 at 11 and may be easily detached therefrom.

Yieldingly mounted within the cap 10 upon a plurality of bolts 12 is a reflector 13 of suitable contour and having a flange 14 formed integral therewith and extending therearound. A coil spring 15 surrounds each stud 12, one extremity of said spring bearing against the inner surface of the cap 10 and the other extremity bearing against the rear surface of the flange 14 and forcing said flange against the head of said bolt. A lamp socket 16 of well known construction is fast to the reflector 13 and has an electric light bulb 17 mounted therein. Electric light wires 18 connect the socket 16 with a suitable source of electric supply in the usual well known manner.

Located at the opposite end of the casing 8 from the cap 10 is a cap 19 which has screw-threaded engagement with the cylindrical member 9 at 20 and has an opening 21 formed therein. A lens 22 is mounted upon the cap 19 in front of the opening 21, being fastened thereto by a flange 23 fast to said cap. The longitudinal median line of the lens 22 is coincident with that of the electric light bulb 17 and reflector 13.

Located at the rear of the cylindrical member 9 intermediate the length thereof is an opening 24 in front of which a lens 25 is fastened through the medium of a cap 26. The lens 25 is preferably composed of red glass and constitutes a tail light for the automobile.

Located in the forward portion of the under side of the cylindrical member 9 is an opening 27 which extends approximately the length of said member. A hood 28 surrounds the opening 27 and is fastened to the exterior of the cylindrical member 9 and the walls of said hood are arranged to direct the rays of light which pass through the opening 27 upon the surface of the automobile license plate 5 which is located a little below and in front of the casing 8, thereby illuminating said plate, together with the ground immediately adjacent to the rear of the automobile. A glass plate 29 is fastened to the hood at the outer end of the passage 30 extending therethrough by a suitable rim 31. The inner surface 32 of the cylindrical member 9 is polished to provide a reflecting surface in order that certain rays of light striking thereagainst may be reflected rearwardly through the opening 24 and lens 25, while other rays of light may also be reflected through the opening 27, passage 30, in the hood 28 and glass 29.

When the lamp is attached to the rear of the automobile 4, it is preferably positioned so that the longitudinal median line thereof will point at a slight angle downwardly and toward the left of said automobile and the rays of light which pass through the lens 22 will illuminate the rear portion of the automobile adjacent to the left hand rear wheel in such a manner that the driver of a vehicle approaching from the rear will be able to clearly see the parts of the vehicle which he will have to clear in passing, thereby making it easier for him to gauge the distance between the two vehicles and thereby allow a safe amount of clearance room when passing. At the same time the rays of light which are visible through the lens 25 will constitute the usual tail light for the automobile and the rays of light which pass through the hood 28 will clearly illuminate all parts of the license plate, together with the ground immediately adjacent to the rear of the automobile.

We claim:

1. In combination, a vehicle, a lamp supported on and behind said vehicle and comprising a casing provided with an opening in the under side thereof, the interior surface of said casing constituting a reflecting surface, a reflector mounted within said casing at one end thereof, a source of illumination mounted upon said reflector, a hood fast to the exterior of said casing and extending around said opening and adapted to direct rays of light reflected from the reflecting surface of said casing beneath said lamp to illuminate the vehicle license plate, a lens located at the rear of said casing and constituting a tail light for said vehicle and a lens located at the opposite end of said casing from said source of illumination and adapted to direct rays of light laterally of said vehicle to illuminate the rear thereof.

2. A lamp having, in combination, a casing provided with an opening in the under side thereof, the interior surface of said casing constituting a reflecting surface, a reflector yieldingly mounted within said casing at one end thereof, a source of illumination mounted upon said yielding reflector, a hood fast to the exterior of said casing and extending around said opening and adapted to direct rays of light from within said casing forwardly and downwardly from said lamp, a glass plate closing the passage through said hood, a lens located at the rear of said casing and adapted to direct rays of light rearwardly from said lamp and a lens located at the opposite end of said casing from said source of illumination.

3. A lamp having, in combination, a casing embodying therein a member provided with an opening in the under side thereof, the interior surface of said member constituting a reflecting surface, said casing also embodying therein a cap detachably secured to said member at one end thereof, a reflector yieldingly mounted upon said cap within the interior thereof, a source of illumination mounted upon said reflector, a hood upon the exterior of said member extending around said opening and adapted to direct rays of light from within said casing forwardly and downwardly from said lamp, a glass plate closing the passage through said hood, a lens located at the rear of said member and adapted to direct rays of light rearwardly from said lens, said casing also embodying therein a second cap detachably secured to said member at the other end thereof and a lens located upon said last-named cap.

In testimony whereof we have hereunto set our hands in presence of two subscribing witnesses.

FREDERICK W. BECKER.
JOSEPH LAGNER.

Witnesses:
FRANKLIN E. LOW,
HAZEL T. LAMUDGE.